US010158614B2

(12) United States Patent
Castinado et al.

(10) Patent No.: US 10,158,614 B2
(45) Date of Patent: Dec. 18, 2018

(54) DATABASE PROCESSING SYSTEM FOR MULTIPLE DESTINATION PAYLOADS

(71) Applicant: Bank of America Corporation, Charlotte, NC (US)

(72) Inventors: Joseph Benjamin Castinado, Northglenn, CO (US); Kathryn Elizabeth Guthrie, Charlotte, NC (US); Tracey Mochnal, Scotch Plains, NJ (US); Kimberly Craig Turner, Sicklerville, NJ (US)

(73) Assignee: Bank of America Corporation, Charlotte, NC (US)

( * ) Notice: Subject to any disclaimer, the term of this patent is extended or adjusted under 35 U.S.C. 154(b) by 101 days.

(21) Appl. No.: 15/165,433

(22) Filed: May 26, 2016

(65) Prior Publication Data

US 2016/0352700 A1 Dec. 1, 2016

Related U.S. Application Data

(60) Provisional application No. 62/166,260, filed on May 26, 2015.

(51) Int. Cl.
| | |
|---|---|
| *G06F 17/30* | (2006.01) |
| *H04L 29/06* | (2006.01) |
| *H04L 12/58* | (2006.01) |
| *H04L 29/08* | (2006.01) |

(52) U.S. Cl.
CPC ...... *H04L 63/0485* (2013.01); *G06F 17/3048* (2013.01); *H04L 51/18* (2013.01); *H04L 63/0272* (2013.01); *H04L 65/4076* (2013.01); *H04L 67/327* (2013.01)

(58) Field of Classification Search
USPC .......... 726/14, 2, 21, 36; 713/150, 163, 181; 380/255, 264, 276
See application file for complete search history.

(56) References Cited

U.S. PATENT DOCUMENTS

| | | | |
|---|---|---|---|
| 2004/0240446 A1* | 12/2004 | Compton | ................ H04L 45/00 370/389 |
| 2005/0015511 A1* | 1/2005 | Izmailov | ................. H04L 12/18 709/238 |

(Continued)

*Primary Examiner* — Sharif E Ullah
(74) *Attorney, Agent, or Firm* — Banner & Witcoff, Ltd.; Michael A. Springs

(57) ABSTRACT

Aspects of the present disclosure are directed to electronic data transfer methods and systems for multiple recipient destination processing. A plurality of computer readable memory locations in a computer readable database associated with a first entity computer system is maintained. Electronically, via a computer-based data communications network, an instruction is received for electronic data transfer EDI data payload including a stored value data attribute, and data transfer request attribute, and a first recipient destination and a second recipient destination; wherein the first recipient destination and the second recipient destination are associated with different recipient virtual memory locations. Responsive to the data transfer request attribute request being extracted, EDI data payload associated with the stored value data attribute to the first recipient destination and the second recipient destination is transmitted.

14 Claims, 6 Drawing Sheets

(56) References Cited

U.S. PATENT DOCUMENTS

| | | | |
|---|---|---|---|
| 2005/0195823 A1* | 9/2005 | Chen | H04L 12/185 370/395.1 |
| 2011/0107408 A1* | 5/2011 | Blot-Lefevre | G06F 21/46 726/7 |
| 2011/0145528 A1* | 6/2011 | Watanabe | G06F 3/0605 711/162 |
| 2012/0192261 A1* | 7/2012 | Blot-Levevre | G06Q 20/02 726/10 |

* cited by examiner

DATABASE PROCESSING SYSTEM FOR MULTIPLE DESTINATION PAYLOADS

CROSS-REFERENCE TO RELATED APPLICATIONS

The present application claims priority under 35 U.S.C. 120 to U.S. Patent Application No. 62/166,260, filed May 26, 2015. Benefit of the filing date of this prior application is hereby claimed. The prior application is hereby incorporated by reference in its entirety.

BACKGROUND

There exists a need in the art for computer technology system for message protocols products and packages that communicate seamless on a wide-area network (WAN), a local-area network (LAN), a wireless network, a digital subscriber line (DSL) network, a frame relay network, an asynchronous transfer mode (ATM) network, a virtual private network (VPN). In certain industries, development and implementation of new products and services for customers and potential customers is a process and new tangible technologically based services can provide tangible benefits to society.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to electronic data transfer methods and systems for multiple recipient destination processing. A plurality of computer readable memory locations in a computer readable database associated with an entity computer system may be maintained. Electronically, via a computer-based data communications network, an instruction may be received for electronic data transfer EDI data payload including a stored value data attribute, and data transfer request attribute, and a first recipient destination and a second recipient destination; wherein the first recipient destination and the second recipient destination are associated with different recipient virtual memory locations. Responsive to the data transfer request attribute request being extracted, EDI data payload associated with the stored value data attribute to the first recipient destination and the second recipient destination is transmitted.

In another aspect, a system or method may include enabling distribution of the stored value to the recipient destinations based on electronic data transfer technology.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
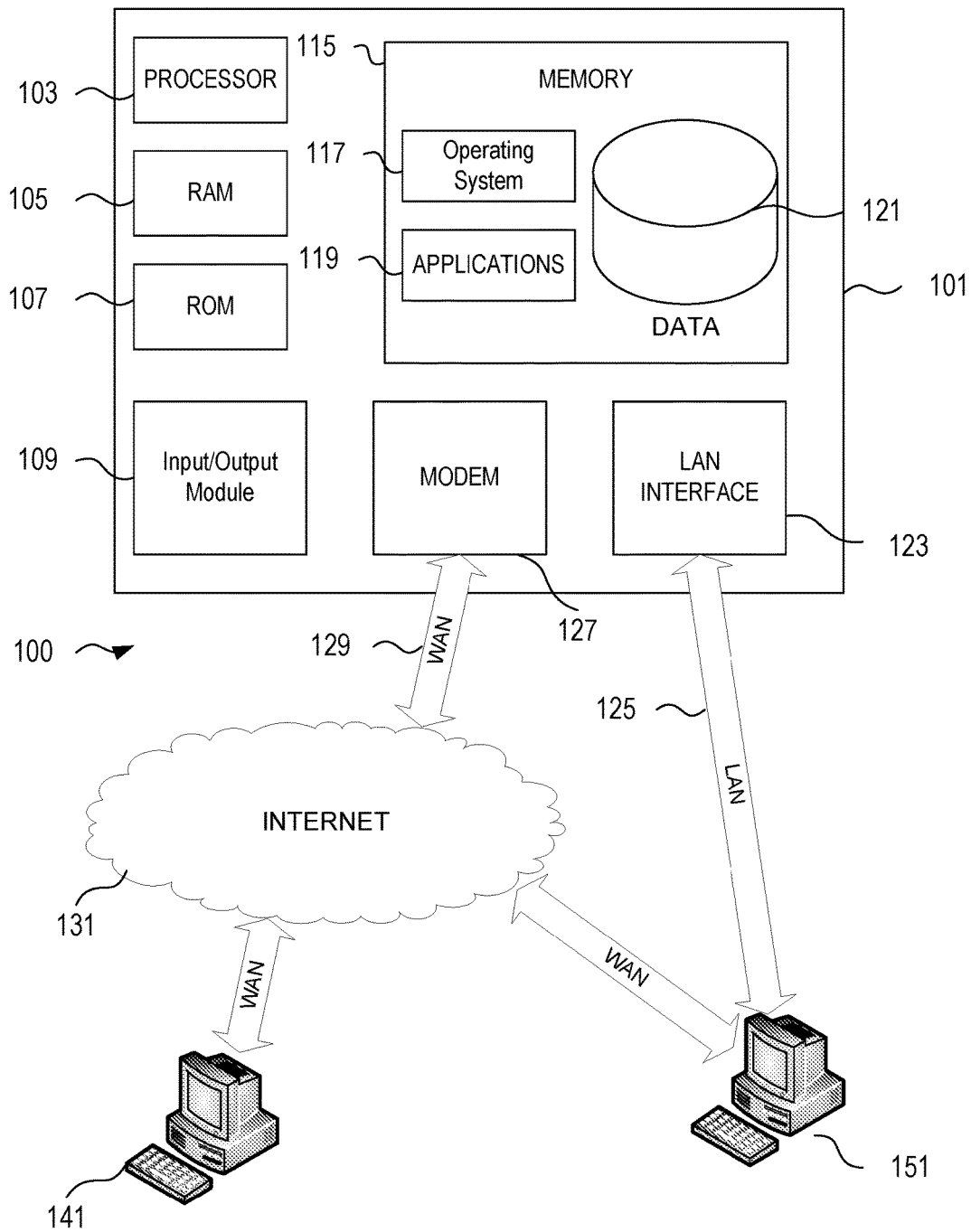
FIG. 1 illustrates a schematic diagram of a digital computing environment in which certain aspects of the present disclosure may be implemented.

FIG. 1 illustrates a block diagram of an electronic database computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other special purpose computing system environments or configurations. Examples of well known computing systems, environments, and/or configurations that may be suitable for use with the disclosure include, but are not limited to, personal computers, server computers, hand-held or laptop devices, multi-processor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
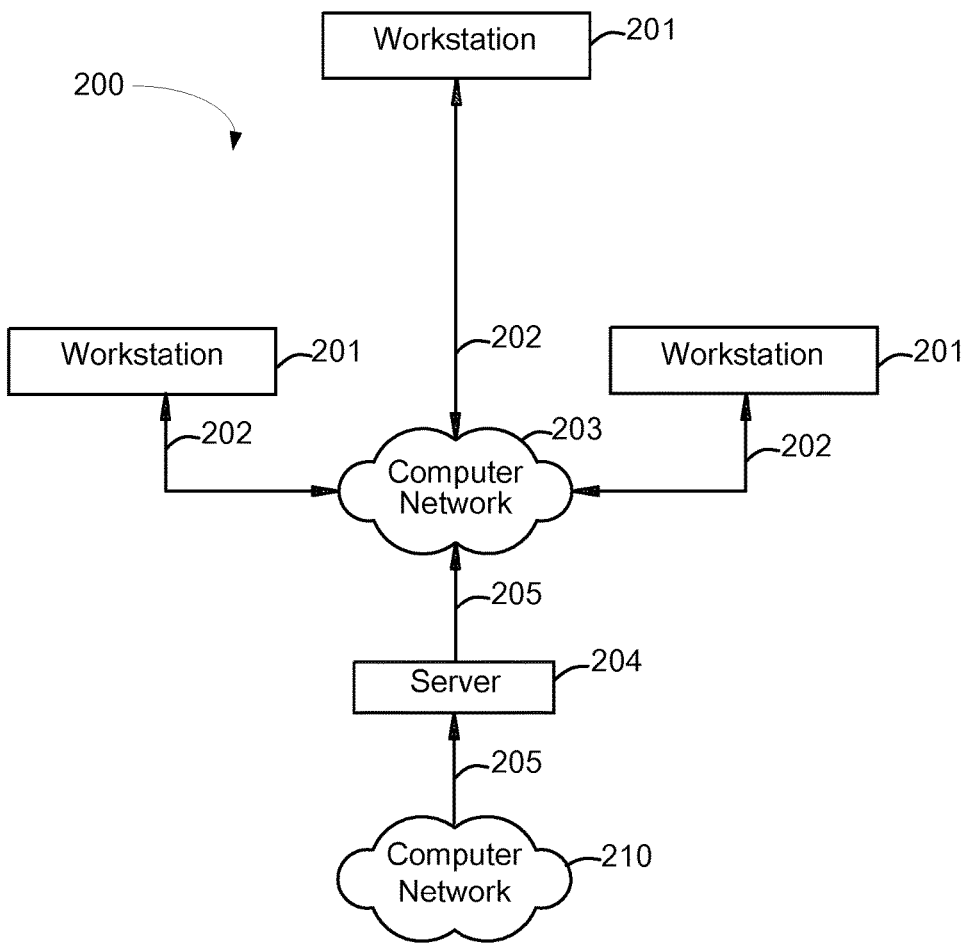
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3A:
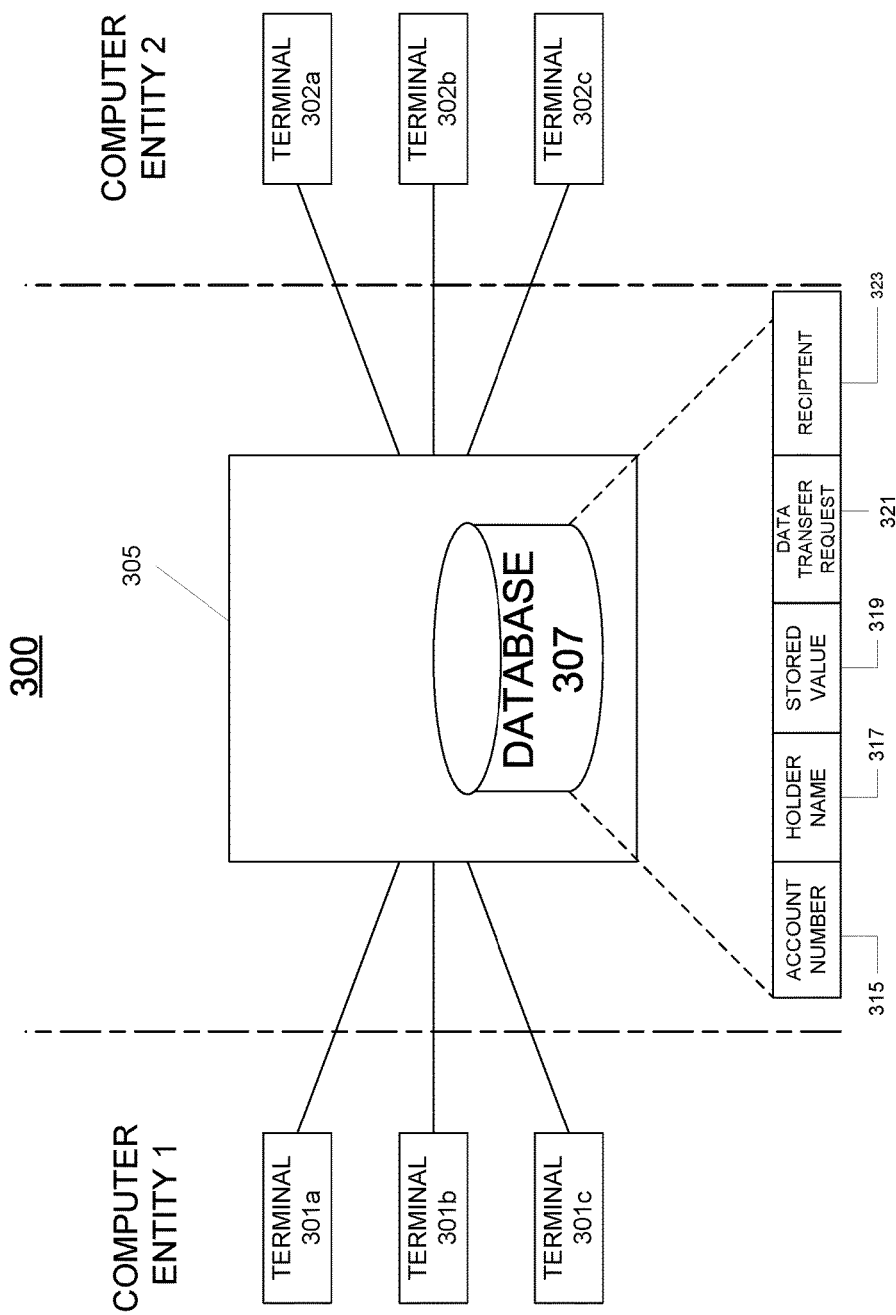
FIGS. 3A-3D are an illustrative functional block diagram of workstations, database and servers that may be used to implement the processes and functions of certain embodiments.
Figure 3B:
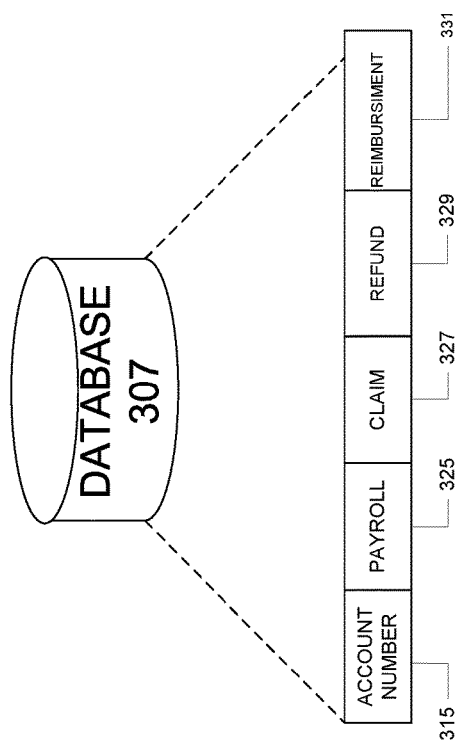
Figure 3C:
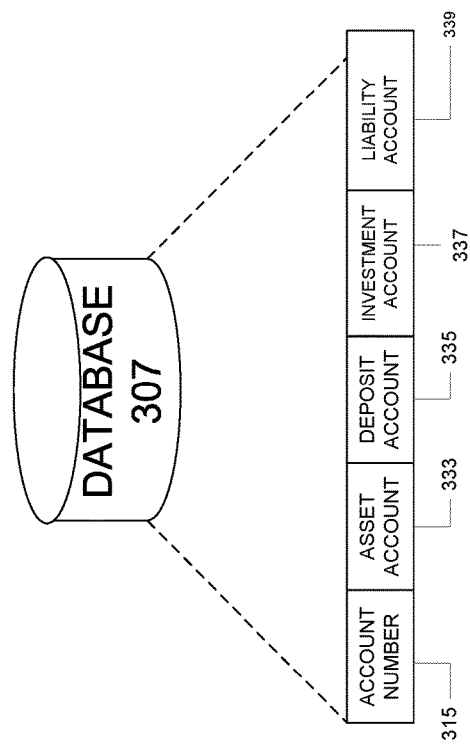
Figure 3D:
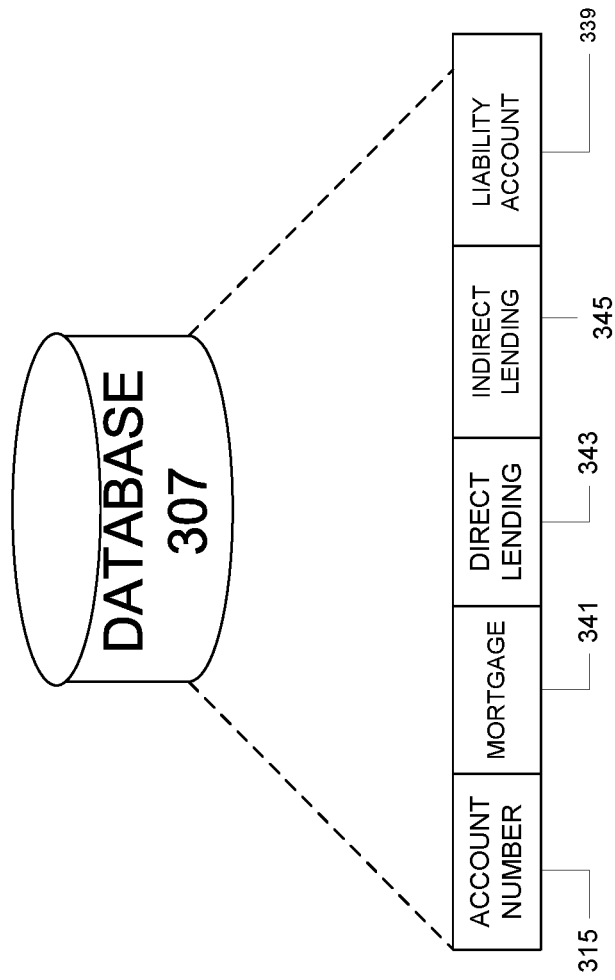

FIG. 3A illustrates an example of representative infrastructure according to some embodiments in the disclosure. The different entity users 301a-301c (such as stored value repositories systems), via terminals/workstations, electronically communicates with a plurality of different entities (such as, lienholders) devices 302a-302c, through the electronic stored value data transfer processing system 300 including server 305 and electronic database 307. In one embodiment, users execute commands with terminals/workstations to exchange data transfer information with the processing system 300. These terminals may be standard personal computers as are known in the art. In alternative embodiments, the users may use hand-held or other portable electronic devices as known in the art to communicate with the system 300. The system includes, for example and without limitation, server 305. Server 305 may include an electronic mail server, which may be used to receive and send data via email or over the Internet. The system 300 may use various attribute data in the Electronic Data Interchange (EDI) format for electronic data transfer of stored value as discussed in the foregoing. Server 305 can process an EDI messages transmitted through the system 300 to improve computer processing add functionally to electronic data transfer systems thereby bring new tangible electronic data transfer functions to the improve EDI messaging.

FIGS. 3A-3D are merely illustrative and the number of, users and/or user terminals, financial entities, servers and databases is not in any way limited. Furthermore, although various embodiments are described in the context of a single system, one of ordinary skill in the art may appreciate that the described functionality may be implemented across multiple systems. Moreover, a web site may be mirrored at additional systems in the network and, if desired, one or more management systems or other computer resources may be used to facilitate various functions. The computer program at the system 300 includes appropriate screen routines for generating a set of screens that together comprise a graphical user interface for the site.

The system 300 can provide messages in the communication cycle in an authenticated format, secure for each party that would be invited or authorized to be a part of the multiple payee processing service. In some constructions, would have to meet certain factors of data security. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, at least two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

Figure 4:
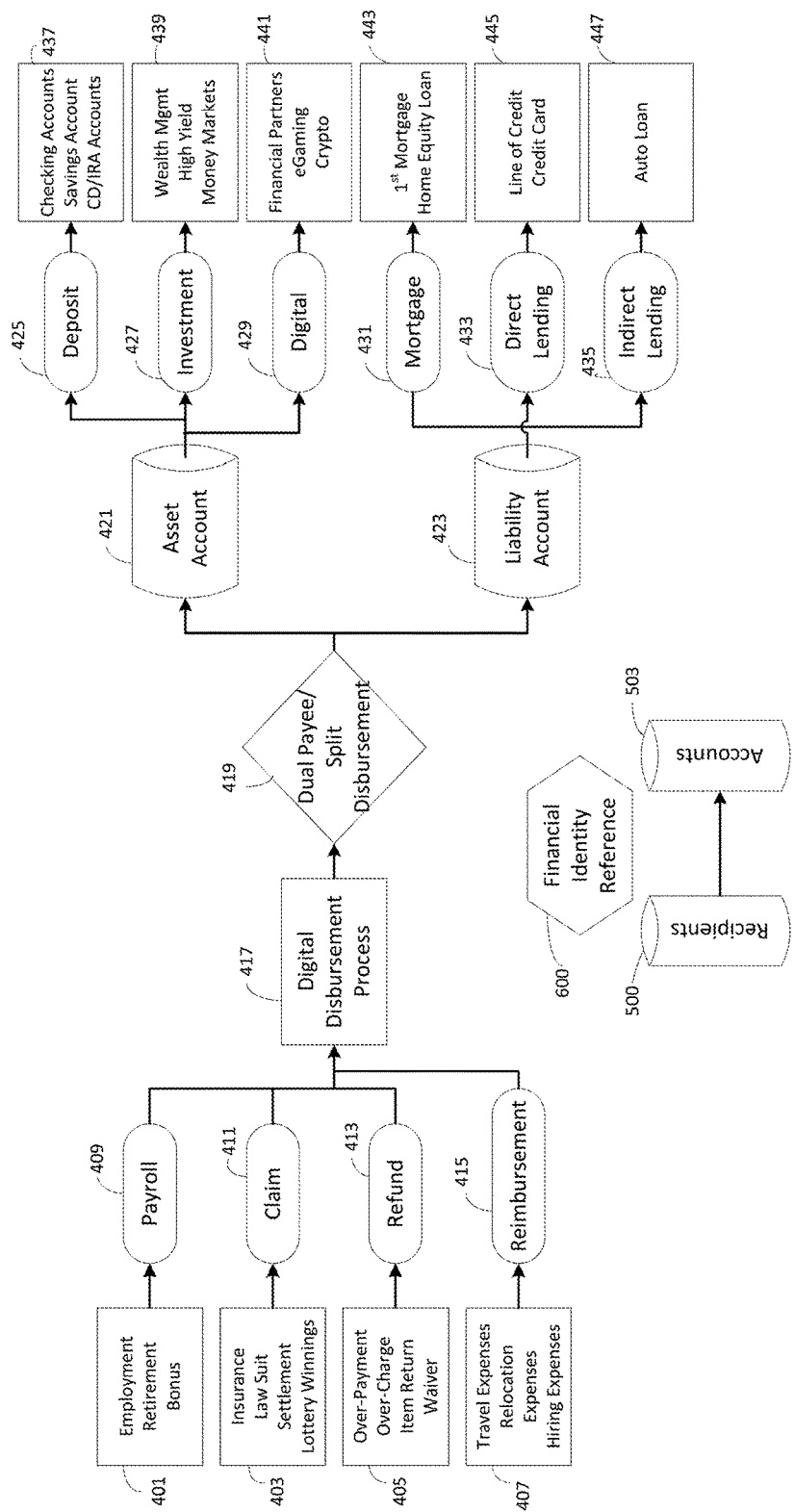
FIG. 4 is an example flow chart of an illustrative method for in accordance with at least one aspect of the present disclosure.

According to some aspects, a centralized protocol exchange server system 300 for bi-directional communications provides various companies, lienholders and patrons efficiency for processing for electronic data transfer and/or electronic data extraction signifying approval for transfer of Electronic Data Interchange (EDI) payloads. In one construction, the protocol exchange server system 300 provides bi-directional messaging back and forth that inputs requests for approval of multiple recipient destinations (e.g., IP addresses). The recipient of the disbursement is considered the authorized owner or approved beneficiary of the stored value and has either directly or indirectly authorized the transfer of stored value from the stored valued repository to the multiple destination accounts/instruments. The system 300 enables the person reviewing the data transfer request to authorize it or not, via electronic methods or automated electronic data processing (ADP). If the system 300 authorize the stored value, an EDI message payload is sent to the central protocol exchange server system 300 that will provide the information to a computer system whether the stored value 319 can be released or not, electronically to the recipient destination points(s) 503 (FIG. 4).

Referring to FIGS. 3A-3D, in one aspect, the entity computer sends a computer readable instruction for a data transfer to a recipient destination 500 for a stored value data. The system may use various attribute data in the Electronic Data Interchange (EDI) format. In one implementation, the EDI message can use, for example, IPSEC circuitry for secure encrypted communications. The EDI messages can be electronically processed according any number of formats and data sequences. In one case, the EDI format and payload, may include an account number/loan number attribute 315 (such as a policyholder identifier), a name attribute 317, a dollar amount of transfer (stored value attribute 319), and data transfer request attribute data 321, and payee attribute data 323. Other EDI formats and payload, may include payroll attribute data 325, claim attribute data 327, refund attribute data 329, reimbursement attribute data 331. Still other EDI formats and payload may include an asset account attribute data 333 which can point to a deposit attribute data 335, investment attribute data 337. Furthermore, the EDI format and payload may include a liability account attribute data 339 which points to a mortgage attribute data 341, direct lending attribute data 343, or indirect lending attribute data 345. In the EDI format and payload, the "attribute" includes ASCII characters in computer readable form or complied data.

The system 300 performs a function of a centralized data transfer and processing hub that connects stored value repositories and network recipient destinations. The steps that follow in the FIG. 4 may be implemented by one or more of the components in FIGS. 1, 2 and 3A-D and/or other components, including other computing devices.

Referring to FIG. 3A, in a general overview, protocol exchange server system 300 electronically maintains a plurality of memory locations for recipients associated with an first entity computer system 301 (e.g., insurance company, payroll processing, stored value repository) and a second entity computer system 302 (e.g., bank, lienholder, or servicing company for lienholder, company, person account holder) in an electronic database 307. In such an example, the separate memory data attributes 500 may be stored within a non-transitory computer readable memory/database 121, such as memory 115 and/or RAM 105 in FIG. 1 or electronic database 307 of FIGS. 3A-3D. The system 300 electronically, receives EDI payload data representative of a stored value data, and a data transfer request attribute associated with at least one memory location 315 requiring the stored value data 319 to be extracted into multiple recipient destinations 323. In one construction, a temporary virtual memory location 121 with virtual sub-memory locations may be linked with the data transfer request attribute 321 for the multiple recipient destinations 503. Each temporary virtual sub-memory location is associated with each designated recipient destination. The stored value repository will provide the system 300 multiple recipient payloads with the instructions for the data transfer request to the virtual memory locations and sub-memory locations 121. Subsequently, the system 300 can verify the stored value repository's ability to provide the stored value data 319 for the disbursement. Once approval is obtained, the processing system 300 operating logic (e.g., computer-executable instructions, such as program modules, being executed by a computer) may evaluate the financial liabilities, leans, garnishments or other legal obligations held against the recipient 500 of stored value data 319 to determine if any of the obligations are considered eligible for receipt of all or partial funds disbursements. The system 300 can leverage internal financial information as well as third party data to determine the pay-offs, partial-payments, principal-only, tax-related or full payment amounts as desired.

Then, responsive to the data transfer request being approved by the stored value repository database system in accordance with the predetermined data transfer policy including financial liabilities, leans, garnishments or other legal obligations held against the recipient of funds, EDI data representative of the data transfer request may be electronically transmitted to the recipient 500 from said temporary virtual sub-memory locations, by way of secure transmission by IPSEC. Subsequently, system 300 enables the transmission of the stored value data to a memory location 503 via electronic money funds transfer (EFT) protocol or other system.

The steps that follow in FIG. 4 can be implemented to include a computer readable transaction history or log of the status within process flows that can be maintained or otherwise stored within a memory/database, such as memory 115 and/or RAM 105 in FIG. 1 or electronic database 307 of FIGS. 3A-3D. In one construction, the steps that follow in the FIG. 4 can be implemented where the customer or financial entities can receive inquiries, via an automatic push notification or a report that sends to the inquirer an electronic mail, text messaging via Short Messaging Service (SMS) component of phone, web, or mobile communication systems, using standardized communication protocols that allow the exchange of short text messages between fixed line or mobile phone devices. In another manner, the customer or financial entities can receive inquiries via a pull format where the inquirer initiates the query at various steps and the notification can be electronic mail or Short Messaging Service technology for cellular phones.

Referring to FIG. 4 process flow of system 300, in Steps 401-415, an entity can specifically designate momentary amount electronically by processing electronic attribute data via EDI using system 300 with a webpage, for example for various items for a payroll (e.g. Step 409), such as an employment, retirement, or bonus (e.g., Step 401). Additionally, an entity can specifically designate momentary amount electronically for various items for a claim (e.g., Step 411), such as insurance data transfers or other claims (e.g., Step 403). Still further, an entity can specifically designate momentary amount electronically for various items for a refund (e.g. Step 413), such as an over-payment, item return fee or other refund 405. In still aspects, an entity can specifically designate momentary amount electronically for various items for a reimbursement (e.g. Step 415), such as a travel expense, relocation expense, or other reimbursement items (e.g., Step 407). The various items in Steps 401-415 are electronic logically via computer readable instructions linked to electronic attribute data for EDI message processing via system 300.

In Step 417, the stored value data is processed electronically via a digital data transfer computer readable process via electronic data transfer information technology including a secure encrypted identity reference 600 linked to the recipient destination 500. In Step 419, a dual recipient or split distribution process is initiated using the EDI format attribute data of system 300. In one construction, the processing system 300 may transfer stored value data to any financial liability memory location 121 determined to be eligible to receive the data using the most effective (determine to be either cost or time) transfer capabilities. In such a system, EDI format may designate stored value split for processing and transfer in Step 421 into asset memory location 121 and in Step 423 to a liability memory location 121 of the recipient destination 503. Optionally, the stored value recipient 500 may also have the additional ability to instruct the system 300 to further split the disbursement of any or all remaining stored value data into multiple authorized memory locations 503 determined by the recipient 500 via EDI message using system 300 with a webpage. In such a case, system 300 designates portions of the stored value data to create temporary virtual memory locations 121 for data transfer purposes associated with the multiple authorized memory locations 503 for recipient 500.

With respect to the asset memory location Step 421, the process flows into one or more of Steps 425-429. For example, in Step 425, the designated stored value amount electronically pertains to a deposit data attribute to flow step 437 for a checking account, saving account, or long-term deposit accounts, such as a Certificate of Deposit (CD) or Individual Retirement Account (IRA) (virtual memory locations). Likewise, in Step 427, the designated momentary amount electronically pertains to an investment attribute to flow step 439, for high yield bond funds, money market accounts. Still further flowing for asset account Step 421, in Step 429, the designated momentary amount electronically pertains to a digital attribute to flow into Step 441 E-gaming.

With respect to liability account process Step 423, the process flows into one or more Steps 431-435. For example, in Step 431, the designated momentary amount electronically pertains to a mortgage servicer by means of EDI message in step 443 to send the stored value data to service a mortgage or home equity loan. In Step 433, the designated momentary amount electronically pertains to a direct lender or lending device by means of EDI message in Step 445 to direct stored value data for servicing a line of credit or debit card. In Step 435, the designated momentary amount electronically pertains to an indirect lender or lending device via EDI message in Step 447 for example auto loan.

The ability to transmit stored value to any authorized financial account or instrument determined either by the system 300 or the recipient's direct instruction is not limited to accounts. The ability to transmit stored value is furthermore not limited to domestic or accounts based solely in the United States of America. For example, the data transfer of stored value could be transferred to improve the Society for Worldwide Interbank Financial Telecommunication (SWIFT) network for international banking computer based networking.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. An electronic data transfer computer implemented method for bi-directional data communications with a protocol exchange computer system, comprising:
   securely electronically maintaining a plurality of computer readable memory locations in a non-transitory computer readable database associated with a first computer system,
   electronically, via a computer-based data communications network connected to the first computer system, receiving an instruction for electronic data transfer EDI data payload including a stored value data attribute, and data transfer request attribute, and a first recipient destination and a second recipient destination; wherein the first recipient destination and the second recipient destination are associated with different recipient virtual memory locations;
   responsive to the data transfer request attribute being extracted via a bi-directional protocol exchange computer system, electronically retrieving an EDI split data instruction associated with the stored value data attribute having at least a first stored value payload and a second stored value payload from a non-transitory computer readable repository database associated with the first computer system, providing temporary virtual memory locations associated with the first stored value payload and the second stored value payload;
   responsive to the EDI split data instruction, electronically authenticating said EDI split data instruction for transmission; and
   responsive to the data transfer request attribute being extracted and the EDI split data instruction being authenticated, transmitting, via the computer-based data communications network, EDI first stored value payload data associated with the stored value data attribute to the first recipient virtual memory location and EDI second stored value payload data associated with the stored value data attribute to the second recipient virtual memory location.

2. The method of claim 1, further comprising a step of electronically enabling transmission of EDI data representative of data transfer request approval notification to an electronic device associated with a designated IP address associated with said memory location.

3. The method of claim 2, wherein the EDI data payload representative of the data transfer request approval notification comprises an electronic message.

4. The method of claim 1, wherein responsive to the data transfer request attribute request being extracted, enabling electronic data transfer of the stored value to least one memory location of the plurality of memory locations linked to a recipient destination.

5. One or more non-transitory computer readable media storing computer executable instructions that, when executed by at least one processor, cause the at least one processor to perform an electronic data transfer computer implemented method for bi-directional data communications with a protocol exchange computer system, comprising:
   electronically maintaining a plurality of computer readable memory locations in a non-transitory computer readable database associated with a first computer system,
   electronically, receiving an instruction for electronic data transfer EDI data payload including stored value data attribute, and data transfer request attribute, and a first recipient destination and a second recipient destination; wherein the first recipient destination and the second recipient destination are associated with different recipient virtual memory location;
   electronically, responsive to the data transfer request attribute being extracted via a bi-directional protocol exchange computer system, retrieving an EDI split data instruction associated with the stored value data attribute having a first stored value payload and a second stored value payload from a non-transitory computer readable repository database associated with the first computer system, providing temporary virtual memory locations associated with the first stored value payload and the second stored value payload;

responsive to the EDI split data instruction, electronically authenticating said EDI split data instruction for transmission: and responsive to the data transfer request attribute being extracted and the EDI split data instruction being authenticated, transmitting EDI first stored value payload data associated with the stored value data attribute to the first recipient virtual memory location and EDI second stored value payload data associated with the stored value data attribute to the second recipient virtual memory location.

6. The one or more non-transitory computer readable media of claim 5, further comprising electronically enabling transmission of EDI payload including data representative of data transfer request approval notification to an electronic computer device associated with a designated IP address associated with the at least one memory location.

7. The one or more non-transitory computer readable media of claim 5, wherein the EDI data representative of data transfer request approval notification comprises an electronic mail message.

8. The one or more non-transitory computer readable media of claim 5, wherein the EDI data representative of data transfer request approval notification comprises an SMS message.

9. The one or more non-transitory computer readable media of claim 5, wherein responsive to the data transfer request attribute request being extracted, enabling electronic data transfer of the stored value to least one memory location of the plurality of memory locations linked to a recipient destination.

10. An electronic data transfer computer system for bi-directional data communications with a protocol exchange computer system, comprising:
    at least one computer readable database configured to maintain a plurality of memory locations associated with a first computer system; and
    at least one computing device, operatively connected to the at least one computer readable database, configured to:
        securely receive an instruction for electronic data transfer EDI data payload including stored value data attribute, and data transfer request attribute, and a first recipient destination and a second recipient destination; wherein the first recipient destination and the second recipient destination are associated with different recipient virtual memory locations;
        responsive to the data transfer request attribute being extracted via a bi-directional protocol exchange computer system, retrieve an EDI split data instruction associated with the stored value data attribute having a first stored value payload and a second stored value payload from a non-transitory computer readable repository database associated with the first computer system, providing temporary virtual memory locations associated with the first stored value payload and the second stored value payload; and
        responsive to the data transfer request attribute being extracted and the EDI split data instruction being authenticated, transmitting EDI first stored value payload data associated with the stored value data attribute to the first recipient virtual memory location and EDI second stored value payload data associated with the stored value data attribute to the second recipient virtual memory location.

11. The system of claim 10, further comprising a step of electronically enabling transmission of EDI payload including data representative of data transfer request approval notification to an electronic computer device associated with a designated IP address associated with the at least one memory location.

12. The system of claim 11, wherein the EDI payload data representative of data transfer request approval notification comprises an electronic message.

13. The system of claim 10, wherein responsive to the data transfer request attribute request being extracted, enabling electronic data transfer of the stored value to least one memory location of the plurality of memory locations linked to a recipient destination.

14. The system of claim 10, further comprising creating a temporary virtual memory location associated with the data transfer request attribute.

* * * * *